(12) United States Patent
Iwatate et al.

(10) Patent No.: US 10,486,555 B2
(45) Date of Patent: Nov. 26, 2019

(54) SEAT DRIVING DEVICE

(71) Applicants: MITSUBA Corporation, Gunma (JP); NHK SPRING CO., LTD., Kanagawa (JP)

(72) Inventors: Naohiro Iwatate, Gunma (JP); Junichi Busujima, Gunma (JP); Kenichi Katsube, Kanagawa (JP); Takeshi Nakamura, Kanagawa (JP)

(73) Assignees: MITSUBA CORPORATION, Gunma (JP); NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 15/874,995

(22) Filed: Jan. 19, 2018

(65) Prior Publication Data
US 2018/0208081 A1 Jul. 26, 2018

(30) Foreign Application Priority Data
Jan. 24, 2017 (JP) .................................. 2017-010613

(51) Int. Cl.
*B60N 2/02* (2006.01)
*B60N 2/22* (2006.01)

(52) U.S. Cl.
CPC ......... *B60N 2/0232* (2013.01); *B60N 2/2231* (2013.01); *B60N 2002/0236* (2013.01)

(58) Field of Classification Search
CPC ............ B60N 2/0232; B60N 2/2231; B60N 2002/0236; B60N 2002/024
USPC ......... 297/362.11, 361.1, 354.12, 354.1, 353
See application file for complete search history.

(56) References Cited

U.S. PATENT DOCUMENTS

| | | | | |
|---|---|---|---|---|
| 6,712,727 B2* | 3/2004 | Kujira | .................... | F16H 37/041 475/149 |
| 7,041,024 B2* | 5/2006 | Becker | ................. | B60N 2/0232 475/162 |
| 8,443,690 B2* | 5/2013 | Koga | ................... | B60N 2/0232 74/425 |
| 8,845,029 B2* | 9/2014 | Voelz | ....................... | B60N 2/22 297/362.11 |
| 2002/0089223 A1* | 7/2002 | Yu | ........................ | B60N 2/0232 297/362.11 |
| 2005/0221957 A1* | 10/2005 | Sheng | ................... | B60N 2/0232 477/162 |
| 2009/0021066 A1* | 1/2009 | Nathan | ................ | B60N 2/2231 297/362 |

(Continued)

FOREIGN PATENT DOCUMENTS

JP 9-86241 3/1997
JP 9-109750 4/1997

*Primary Examiner* — Mark R Wendell
(74) *Attorney, Agent, or Firm* — Wenderoth, Lind & Ponack, L.L.P.

(57) ABSTRACT

A seat 1 has a seat cushion 2 and a seat back 3 and is mounted on a vehicle such as a car. A reclining mechanism 4 capable of adjusting the tilt angle of the seat back 3 is provided between the seat cushion 2 and the seat back 3. The reclining mechanism 4 has a seat driving device 21 provided with an electric motor 22 and a speed reduction mechanism 23. The speed reduction mechanism 23 has a worm shaft 45 connected to a motor shaft 34 of the motor 22 and a worm wheel 47 meshed with a worm 46 of the worm shaft 45. The worm 46 is a multi-thread worm having two or more threads.

7 Claims, 4 Drawing Sheets

(56) References Cited

U.S. PATENT DOCUMENTS

| | | | |
|---|---|---|---|
| 2009/0284062 A1* | 11/2009 | Sakai | B60N 2/0232 |
| | | | 297/354.1 |
| 2010/0170354 A1* | 7/2010 | Haraguchi | B60N 2/0232 |
| | | | 74/55 |
| 2012/0267932 A1* | 10/2012 | Narita | B60N 2/2252 |
| | | | 297/354.1 |
| 2014/0203610 A1* | 7/2014 | Line | B60N 2/2222 |
| | | | 297/354.1 |
| 2016/0059752 A1* | 3/2016 | Kishida | F16H 57/039 |
| | | | 297/344.12 |
| 2016/0169327 A1* | 6/2016 | Fujita | B60N 2/2227 |
| | | | 297/361.1 |
| 2016/0297330 A1* | 10/2016 | Linnenbrink | B60N 2/2231 |

* cited by examiner

| Number of threads | 1 | 2 | 3 | 4 | 5 | |
|---|---|---|---|---|---|---|
| Reversibility of armature | 1 | 1/2 | 1/3 | 1/4 | 1/5 | When one thread is set as reference |
| Rotation speed of worm wheel | 1 | 2 | 3 | 4 | 5 | |
| Lead angle | 7.24 | 14.12 | 20.68 | 26.71 | 32.17 | |

Fig. 4

SEAT DRIVING DEVICE

BACKGROUND OF THE INVENTION

Field of the Invention

The present invention relates to a vehicle seat driving device and, more particularly, to an electric seat driving device that performs tilting operation of a seat back.

Related Art Statement

As a vehicle seat such as a car seat, there is known one provided with a seat tilting mechanism that adjusts the reclining angle of a seat back and moves the seat back between a use position and a storage position. Conventionally, such a seat tilting mechanism is generally manually operated; however, in recent years, the number of vehicles mounted with a seat whose tilting operation is electrically performed is increasing mainly in luxurious cars. JP 09-109750 A describes a vehicle seat in which reclining operation of the seat back is electrically performed by an electric motor. In the disclosed technology, the reclining angle of the seat back is adjusted by a seat back adjuster operated by a reclining motor.

In the electric seat as disclosed in JP 09-109750 A, the reclining motor disposed on both sides of the seat is used to change the angle between an upper arm member mounted to the seat back side and a lower arm member mounted to the seat cushion side to change the seat back reclining angle. The reclining motor is mounted with a speed reduction mechanism using a worm and a worm wheel. The body side of the motor is fixed to one of the upper and lower arm members, and the output shaft of the speed reduction mechanism is fixed to the other one of them. When the output shaft is rotated, the angel between the arm members is changed to tilt the seat back.

However, in a conventional electric seat, when an electric motor for drive dose not work due to failure or the like, the seat back is fixed at that position, which may prevent the seat back from being adjusted to a desired position. Particularly, when a failure occurs in a state where the seat back is at the storage position, the seat cannot be returned to the use state, that is, the seat cannot carry an occupant.

In this case, as an emergency operation at the time of a motor failure, a tool or the like may be used to rotate the output shaft of the reclining motor to manually return the seat back to the use state. However, the electric seat is generally mounted with a reverse prevention mechanism, so that the motor side has a structure that does not take the reverse force into account. Therefore, when the shaft directly coupled to the motor is attempted to be rotated, the worm or worm wheel of the speed reduction mechanism part may be damaged. Thus, it is difficult to externally manually return the seat back to the use position, so that seat reclining operation is difficult to perform during abnormality.

Further, when the seat back is to be displaced between the use position and the storage position, if a motor is driven to move the seat back, it takes some time. The movement to the storage position involves less necessity to stop the seat back halfway, and the seat back can be moved in a short time by manual operation. Thus, in the case of the electric seat, temporal stress may be given on a user although the movement work of the seat back itself can be facilitated.

SUMMARY OF THE INVENTION

A seat driving device according to the present invention is provided in a seat having a seat back whose tilt angle can be changed and performs tilting operation of the seat back using an electric motor as a driving source. The seat driving device includes: the electric motor; and a speed reduction mechanism that decelerates rotation of the electric motor and transmits it to the seat back side. The speed reduction mechanism includes a worm shaft connected to a rotary shaft of the electric motor and a worm wheel meshed with a worm formed in the worm shaft and connected to the seat back side. The worm is a multi-thread worm having two or more threads.

In the present invention, the multi-thread worm is used in the speed reduction mechanism of the seat driving device, so that it is possible to speed up the tilting operation of the seat back without changing the motor rotation speed. Thus, performance of the seat can be improved while suppressing motor operation noise. Further, the moving time of the seat back can be shortened, allowing temporal stress on a user to be alleviated. Further, adopting the multi-thread worm facilitates rotation of the worm from the worm wheel side, which in turn facilitates manual reverse operation in emergency. This allows the manual reverse operation to be performed from outside the seat driving device, and hence, the state of the seat back can be manually changed even in emergency. Thus, even when the motor fails to operate, the seat back can still be moved to a desired position. Further, even when a failure occurs in a state where the seat back is at the storage position, the seat can be returned to the use state.

In the seat driving device, the speed reduction mechanism may further include an output member connected to the worm wheel and coupled to the seat back side. The seat driving device may be configured to be attached with a manually operable member with which the output member can be operated from outside the device so as to allow the warm shaft to be rotated from outside the device using the manually operable member when the electric motor fails to operate. The lead angle of the worm may be in a range of 14° to 33°.

BRIEF DESCRIPTION OF THE DRAWINGS

FIG. 4 is a table illustrating the relationship between the number of threads of a worm and seat back operation.

DESCRIPTION OF THE PREFERRED EMBODIMENTS

Hereinafter, an embodiment of the present invention will be described in detail based on the drawings. An object of the present embodiment is to provide a seat driving device capable of manually performing angle adjustment operation of a seat back without damaging a motor even at failure. Another object of the present embodiment is to quickly move the seat back to the storage position to alleviate temporal stress on a user.

Figure 1:
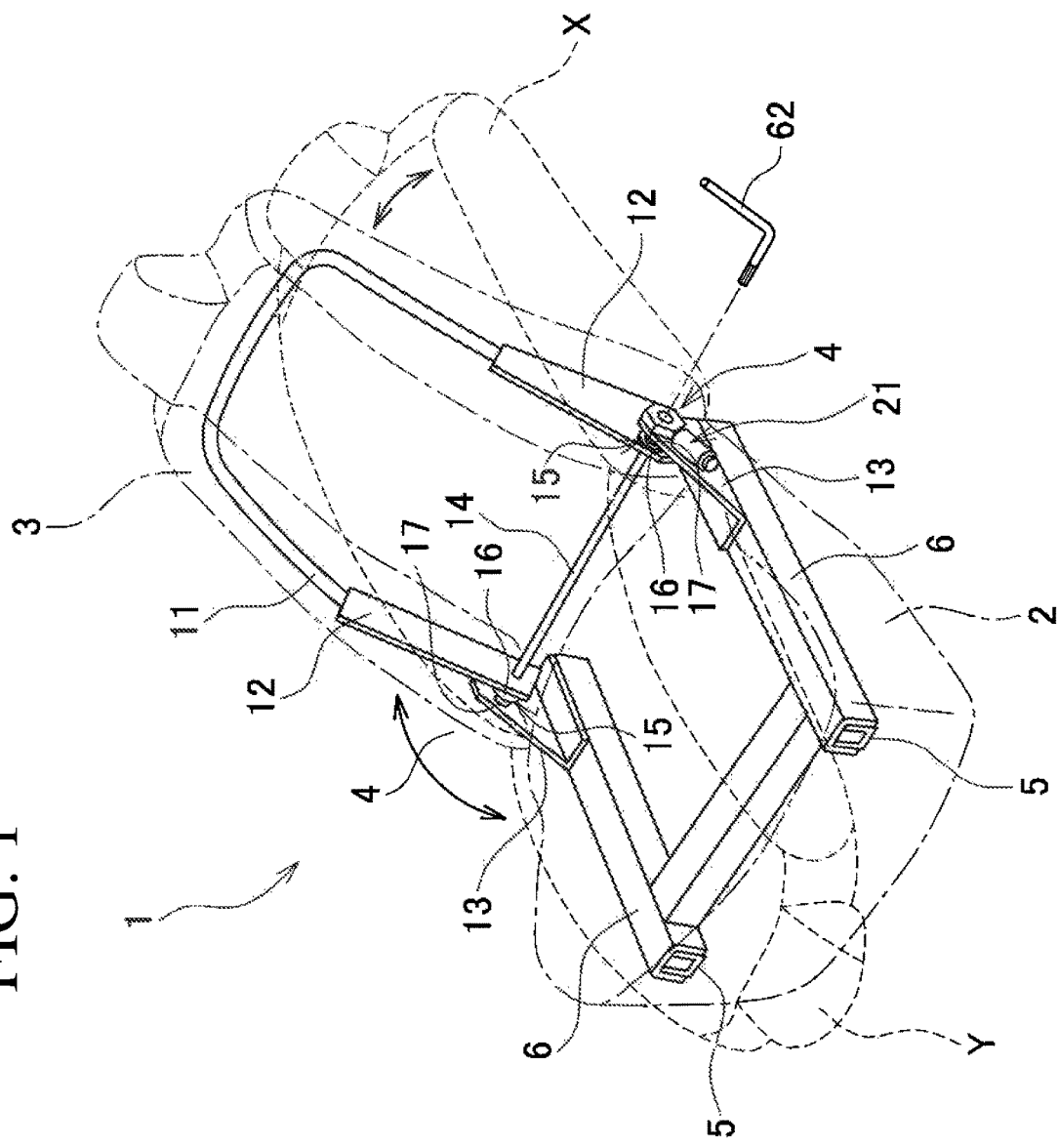
FIG. 1 is an explanatory view illustrating the configuration of a vehicle seat using a seat driving device according to an embodiment of the present invention.

FIG. 1 is an explanatory view illustrating the configuration of a vehicle seat using a seat driving device according to the embodiment of the present invention. As illustrated in FIG. 1, a seat 1 is constituted of a seat cushion 2 and a seat back 3 and is mounted on a vehicle such as a car. A reclining mechanism 4 is provided between the seat cushion 2 and the seat back 3. In the seat 1, the reclining mechanism 4 that can appropriately adjust the tilt angle of the seat back 3 has a seat driving device 21 using an electric motor. That is, the seat 1 is an electric seat.

A lower rail 5 and an upper rail 6 are provided in a pair at the left and right sides of the seat cushion 2. The lower rail 5 is fixed to the floor of the vehicle, and upper rail 6 is mounted so as to be movable with respect to the lower rail 5. The seat back 3 has a substantially U-like shape seat back frame 11. The lower end side of the frame 11 is connected to the upper rail 6 of the seat cushion 2 through the reclining mechanism 4. The reclining mechanism 4 has an upper arm 12 and a lower arm 13 mutually turnably connected to each other. The upper arm 12 is mounted to the lower end portion of the frame 11. The lower arm 13 is mounted to the rear end portion of the upper arm 12. The left and right reclining mechanisms 4 are connected by a connecting rod 14. The left and right reclining mechanisms 4 operate in sync with each other during reclining.

A recliner 15 using a differential transmission mechanism (taumel mechanism) is interposed between the upper arm 12 and the lower arm 13. The recliner 15 has a turning plate 16 fixed to the upper arm 12 side and a fixed plate 17 fixed to the lower arm 13 side. A sliding locking member (not illustrated) connected to the connecting rod 14 is provided between the turning plate 16 and the fixed plate 17. The sliding locking member can transition between a lock state and a lock release state to thereby change the connection state between the turning plate 16 and the fixed plate 17. When the connecting rod 14 is rotated by the seat driving device 21 in a state where the sliding locking member is put in the lock release state, the turning plate 16 is turned. As a result, the upper arm 12 is turned with respect to the lower arm 13, whereby the seat back 3 is reclined.

Figure 2:
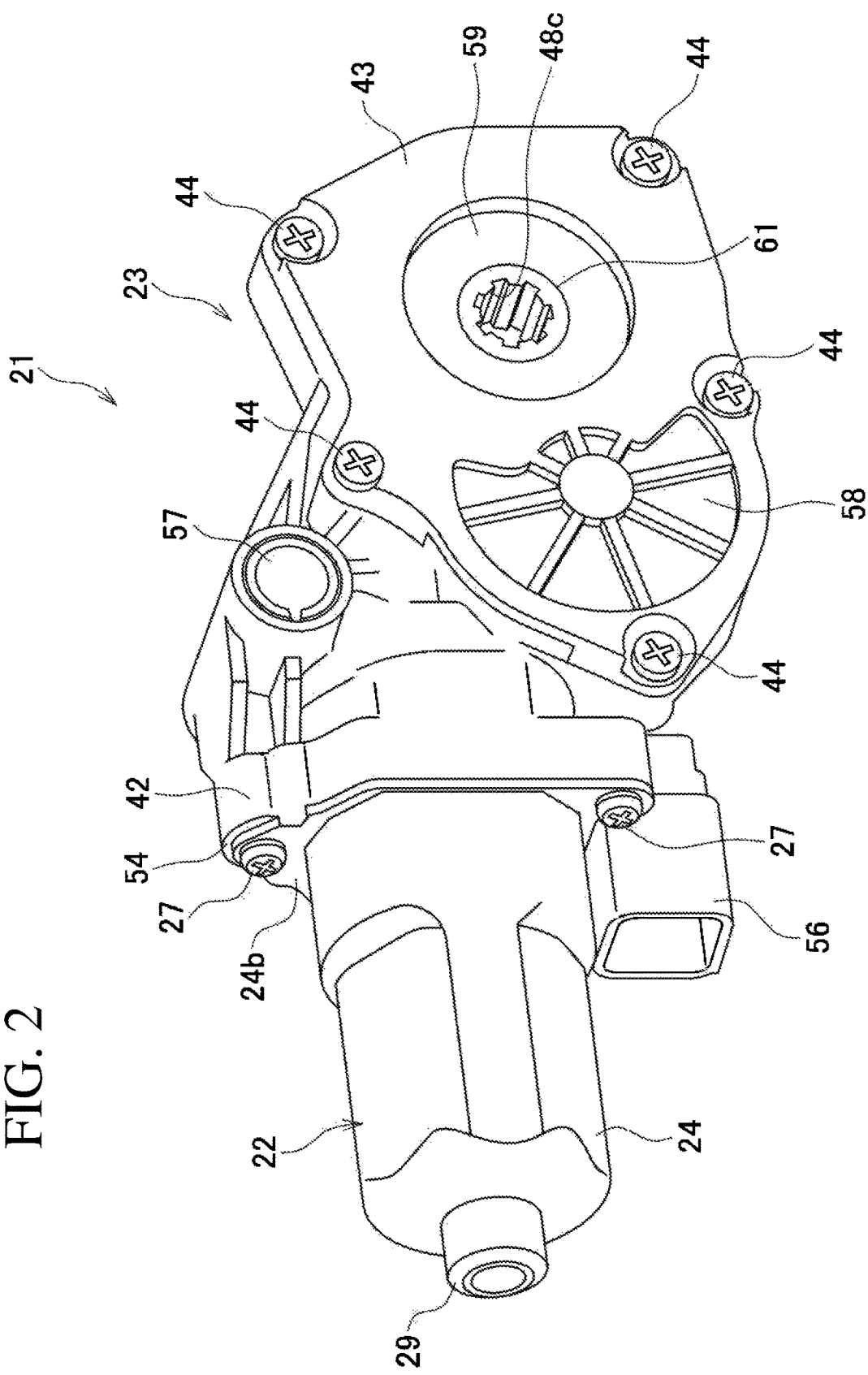
FIG. 2 is a perspective view of the seat driving device according to the embodiment of the present invention.
Figure 3:
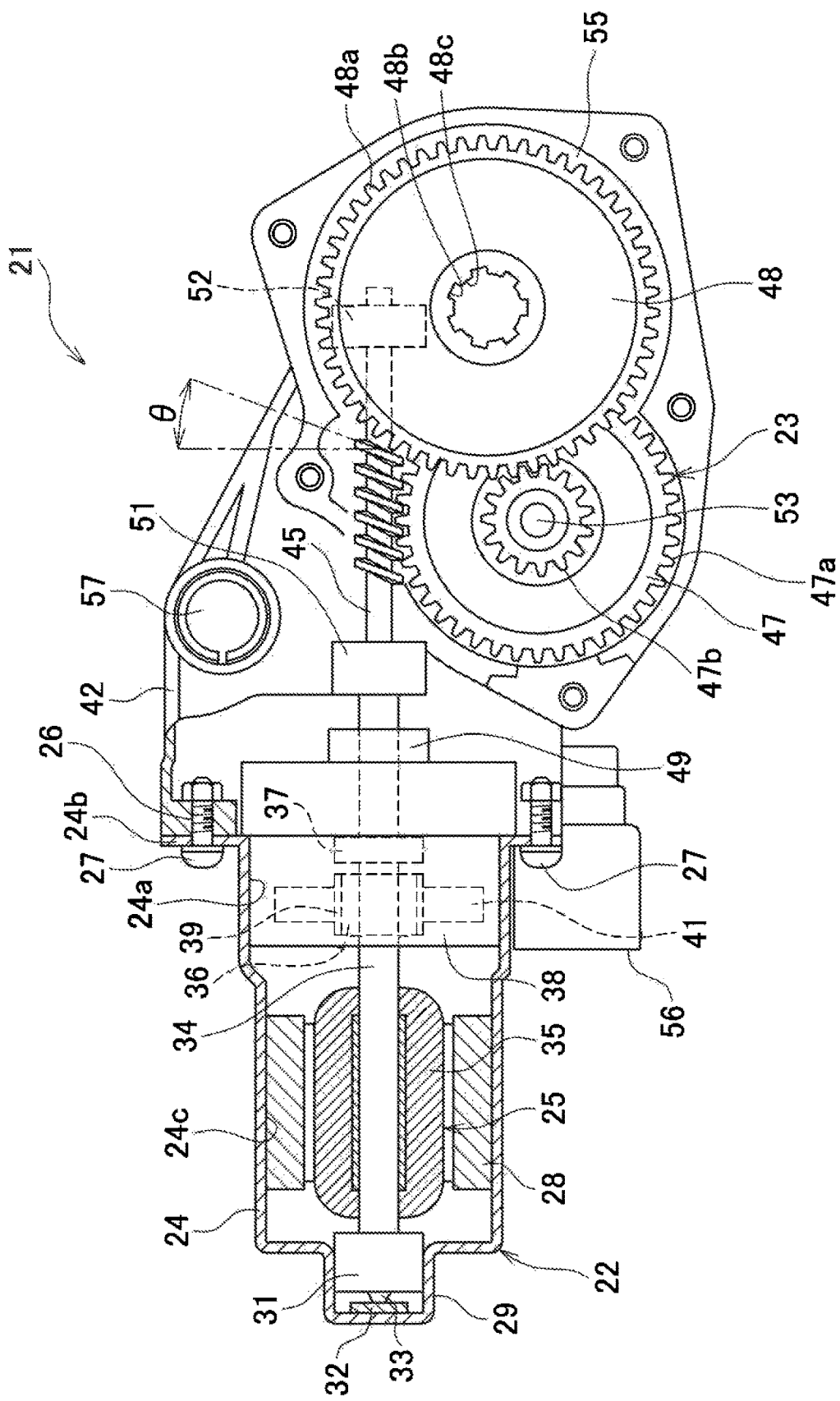
FIG. 3 is an explanatory view illustrating the internal configuration of the seat driving device of FIG. 2.

The seat driving device 21 is provided in the reclining mechanism 4 as a driving source for reclining operation. FIG. 2 is a perspective view of the seat driving device 21 according to the embodiment of the present invention, and FIG. 3 is an explanatory view illustrating the internal configuration of the seat driving device 21. As illustrated in FIGS. 2 and 3, the seat driving device 21 is constituted as so-called a motor unit with speed reducer and has an electric motor 22 and a speed reduction mechanism part 23 which are integrally formed. In the seat 1, when the motor 22 is actuated by operating a reclining switch (not illustrated), the tilt angle of the seat back 3 is changed, whereby the seat back 3 is displaced between a flat position X and a storage position Y (see FIG. 1).

The motor 22 is a motor with brush and has a bottomed cylindrical motor housing 24 and an armature 25 rotatably supported in the housing 24. The housing 24 is fitted such that an opening part 24a thereof faces the speed reduction mechanism part 23. An outer flange part 24b is formed in the periphery of the opening part 24a of the housing 24 so as to be bent. A bolt hole 26 is formed in the outer flange part 24b. A bolt 27 is inserted through the bolt hole 26 and fastened to the speed reduction mechanism part 23, whereby the motor 22 and the speed reduction mechanism part 23 are integrated.

A plurality of magnets 28 are attached to an inner peripheral surface 24c of the housing 24 by an adhesive or the like. At the bottom of the housing 24, a protruding part 29 is formed so as to protrude axially outward. A sliding bearing 31 is fitted and fixed to the inside of the protruding part 29. A thrust plate 32 is provided at the bottom of the protruding part 29. The thrust plate 32 receives a thrust load from a motor shaft 34 through a steel ball 33.

The armature 25 has the motor shaft (rotary shaft) 34, an armature core 35 externally inserted and fixed to the shaft 34, and a commutator 36 disposed on the speed reduction mechanism part 23 side relative to the armature core 35. One end portion (the left end side in FIG. 3) of the shaft 34 is rotatably supported to the housing 24 by the sliding bearing 31 provided in the housing 24. The other end portion (the right end portion in FIG. 3, i.e., speed reduction mechanism part 23 side end portion) of the shaft 34 is rotatably supported to the housing 24 by a sliding bearing 37. The sliding bearing 37 is mounted to a brush holder 38 press-fitted and fixed to the housing 24.

The armature core 35 is a member obtained by laminating magnetic materials such as electromagnetic steel sheets and is disposed at a position corresponding to the magnets 28. A winding (not illustrated) is wound around the armature core 35, and the terminal portion of the winding is connected to the commutator 36. The commutator 36 is a substantially columnar member and is disposed on the other end side of the armature 25. A plurality of plate-like segments 39 are arranged side by side on the outer peripheral surface of the commutator 36. The segments 39 are connected with the terminal portion of the winding. The commutator 36 is in sliding contact with a brush 41 housed in the brush holder 38. The brush 41 is electrically connected to an external power supply (not illustrated), whereby current is supplied to the winding through the brush 41 and commutator 36.

The speed reduction mechanism part 23 has a box-shaped gear case 42 having one opening surface and a gear cover 43 that closes the opening of the gear case 42. The gear cover 43 is fastened and fixed to the gear case 42 by a tapping screw 44. A worm shaft 45 to which power of the motor 22 is transmitted, a worm wheel 47 to be meshed with a worm 46 of the worm shaft 45, and an output wheel (output member) 48 to be meshed with the worm wheel 47 are housed in a space closed by the gear case 42 and the gear cover 43. In the speed reduction mechanism part 23, two-step speed reduction is performed by a combination of the worm 46 and the worm wheel 47 and that of the worm wheel 47 and the output wheel 48, thereby ensuring a large reduction ratio with a small space. In the seat 1, a multi-thread worm having two or more threads is used (two threads in the present embodiment) as the worm 46.

The worm shaft 45 is disposed coaxially with the shaft 34 and is connected to the other end side of the shaft 34 through a joint member 49 so as not to be relatively rotated. The worm shaft 45 is rotatably supported to the gear case 42 by two sliding bearings 51 and 52 provided in the gear case 42. The worm wheel 47 to be meshed with the worm shaft 45 has a large-diameter resinous gear 47a and a small-diameter gear 47b made of a metal sintered body insert-molded in the large-diameter gear 47a. The large-diameter gear 47a and the small-diameter gear 47b are disposed concentrically with each other. The large-diameter gear 47a is meshed with the worm shaft 45. The small-diameter gear 47b is meshed with an output gear 48a of the output wheel 48. The worm wheel 47 is axially supported by a worm wheel shaft 53. The worm wheel shaft 53 is rotatably supported by bearing parts (not illustrated) formed respectively in the gear case 42 and gear cover 43.

The output wheel 48 is a substantially disk-shaped member made of a metal sintered body and has the output gear 48a at the outer periphery thereof. An output take-out part 48b that outputs a rotation torque to an external device is formed in substantially the center of the output wheel 48.

The output take-out part 48b is a hole that penetrates the output wheel 48 in the thickness direction thereof. The connecting rod 14 connecting the left and right reclining mechanisms 4 is inserted through the output take-out part 48b. An engaging part 48c is formed at the inner peripheral surface of the output take-out part 48b along the peripheral direction. The engaging part 48c is engaged with a concave part (not illustrated) formed in the connecting rod 14. This restricts relative rotation between the connecting rod 14 and the output take-out part 48b, allowing a rotation torque to be output to the connecting rod 14.

The gear case 42 is a member made of, e.g., resin and is formed by injection molding or the like. The gear case 42 has a motor mounting part 54 and a gear housing part 55. The motor mounting part 54 is formed on the motor 22 side (left side in FIG. 3) of the gear case 42. The gear housing part 55 is formed on the side opposite to the motor 22 with respect to the motor mounting part 54. The motor mounting part 54 has an opening at its motor 22 side. The opening of the motor mounting part 54 and the gear housing part 55 communicate with each other through a through hole (not illustrated) through which the shaft 34 is inserted. The motor 22 is mounted to the gear case 42 by inserting the shaft 34 into the through hole from the opening side of the gear case 42 and then fixing the housing 24 to the motor mounting part 54 using the bolt 27. A power-feeding connector 56 is assembled to the motor mounting part 54. Power is supplied from the connector 56 to the motor 22 through the brush holder 38.

A mounting hole 57 for fixing the seat driving device 21 to the vehicle is formed between the motor mounting part 54 and the gear housing part 55. A bolt (not illustrated) is inserted through the mounting hole 57, whereby the seat driving device 21 is mounted to the reclining mechanism 4. In the seat 1, the seat driving device 21 is fixed to the lower arm 13 side. When the motor 22 is actuated, the connecting rod 14 fixed to the upper arm 12 side is turned. As a result, the upper arm 12 is turned with respect to the lower arm 13. This changes an angle between the arm 13 and the arm 12 to tilt the seat back 3.

The gear cover 43 is formed into a substantially flat plate shape and closes the opening of the gear case 42. That is, the gear cover 43 functions as a cover that covers the gear housing part 55. The gear cover 43 has a worm wheel cover part 58 covering the worm wheel 47 and an output wheel cover part 59 covering the output wheel 48. A bearing part (not illustrated) that rotatably supports the worm wheel shaft 53 is formed on the inner side of substantially the center of the cover part 58. An output take-out hole 61 is formed at substantially the center of the cover part 59. The connecting rod 14 is inserted through the output take-out hole 61. A manually operable wrench (manually operable member) 62 for emergency use can be attached to the end portion of the connecting rod 14. When the motor 22 is not actuated due to a failure or some other reason, a tilt state of the seat back 3 can be adjusted by externally directly rotating the connecting rod 14.

In the seat driving device 21, when a user operates the reclining switch, the motor 22 is actuated, and rotation of the shaft 34 is transmitted from the worm shaft 45 to the worm 46, worm wheel 47, and output wheel 48. Then, the connecting rod 14 mounted to the output wheel 48 is turned to change the angle between the lower arm 13 and the upper arm 12. As a result, the seat back 3 is displaced between the flat position X and the storage position Y. During the displacement of the seat back 3 between the positions X and Y, the rotation speed of the worm wheel 47 can be increased without changing a conventional motor specification since the multi-thread worm is used as the worm 46 in the seat driving device 21, which in turn increases the motion of the seat back 3. When the operation speed of the seat back 3 is not changed, the motor rotation speed can be reduced, which correspondingly can reduce the size of the motor, allowing miniaturization of the entire seat driving device 21.

FIG. 4 is a table illustrating the relationship between the number of threads of the worm 46 and seat back operation. As illustrated in FIG. 4, when the number of threads is increased, the rotation speed of the worm wheel 47 is increased in proportion thereto. That is, using the multi-thread worm can increase the operation speed of the seat back 3 without need of increasing the motor rotation speed. Thus, by using the seat driving device 21 according to the present invention, it is possible to improve the performance of the electric seat while suppressing motor operation noise. As a result, the moving time of the seat back 3 can be shortened, allowing temporal stress on the user to be alleviated.

Further, when the number of threads of the worm 46 is increased, a lead angle θ of the worm is also increased. A smaller lead angle may make it difficult to perform reverse rotation from the worm wheel 47 side. Therefore, in a conventional electric seat, manual reverse operation in emergency is difficult to perform as described above. On the other hand, in the seat driving device 21 according to the present invention, adopting the multi-thread worm as the worm 46 facilitates rotation of the worm 46 even when reverse rotation from the worm wheel 47 side is performed. As illustrated in FIG. 4, in a case where a two-thread worm is adopted, reversibility of armature 25 is reduced to half of that of a one-thread worm. Thus, even when an excessive reverse input is given to the worm wheel 47, the worm shaft 45 is reversely rotated.

This allows reverse operation to be performed by the manually operable wrench 62, whereby the state of the seat back 3 can be manually changed even in emergency. Thus, even when an electric motor for drive does not operate due to a failure or the like, the seat back 3 can be moved to a desired position. Further, even when a failure occurs in a state where the seat back is at the storage position, the seat can be returned to the use state, so that a problem that the seat cannot carry an occupant does not occur.

The present invention is not limited to the above embodiment and may be variously modified without departing from the spirit of the invention.

For example, in the above embodiment, a two-thread worm is used as the worm 46; however, the number of threads is not limited to two, and a multi-thread worm having three or more threads can be used. However, in a worm having an excessively large number of threads, a tooth module size is reduced, and manufacturing man-hours are increased. Thus, it is preferable to use a worm having two to five threads (lead angle of about 14° to 33°). Further, in the above embodiment, the left and right upper arms 12 are connected by the connecting rod 14 and are subjected to synchronous control; alternatively, however, the seat driving devices 21 may be disposed to the left and right of the seat, respectively, and subjected to synchronous control so as to operate the upper arms 12.

When the seat back 3 is to be tilted, the operation speed of the seat back 3 may be changed between rearward tilting operation (reclining operation) on the flat position X side and frontward tilting operation (storage operation) on the storage position Y side. That is, by changing the rotation speed of the motor 22 according to the switch operation, it is possible to perform the reclining operation comparatively slowly and perform the storage operation quickly.

What is claimed is:

1. A seat driving device provided in a seat having a seat back whose tilt angle can be changed and being configured to perform a tilting operation of the seat back using an electric motor as a driving source, the device comprising:
   the electric motor; and
   a speed reduction mechanism that decelerates rotation of the electric motor and transmits it to a seat back side, wherein
   the speed reduction mechanism includes a worm shaft connected to a rotary shaft of the electric motor and a worm wheel meshed with a worm formed in the worm shaft and connected to the seat back side, and
   the worm is a multi-thread worm having two or more threads,
   the tilting operation has a rearward tilting operation reclining the seat back on a flat position X side and a frontward tilting operation storing the seat back on a storage position Y side, and
   changing the rotation speed of the electric motor according to a switch operation by a user of the seat to change the operation speed of the seat back so as to perform the frontward tilting operation to be quicker than the rearward tilting operation.

2. The seat driving device according to claim 1, wherein the speed reduction mechanism further includes an output member connected to the worm wheel and coupled to the seat back side, and
   the seat driving device can attach thereto a manually operable member with which the output member can be operated from outside the device, and
   when the electric motor fails to operate, the worm shaft can be rotated from outside the device using the manually operable member.

3. The seat driving device according to claim 2, wherein the lead angle of the worm is in a range of 14° to 33°.

4. The seat driving device according to claim 1, wherein the lead angle of the worm is in a range of 14° to 33°.

5. A seat driving device provided in a seat having a seat back whose tilt angle can be changed and being configured to perform a tilting operation of the seat back using an electric motor as a driving source, the device comprising:
   the electric motor; and
   a speed reduction mechanism that decelerates rotation of the electric motor and transmits it to a seat back side, wherein
   the speed reduction mechanism includes a worm shaft connected to a rotary shaft of the electric motor and a worm wheel meshed with a worm formed in the worm shaft and connected to the seat back side, and
   the worm is a multi-thread worm having two or more threads, and the lead angle of the worm is in a range of 14° to 33° and the rotation speed of the worm wheel increases in proportion to the number of threads so that the multi-thread worm can increase operation speed of the seat back without needing to increase rotation speed of the electric motor.

6. The seat driving device according to claim 5, wherein the speed reduction mechanism further includes an output member connected to the worm wheel and coupled to the seat back side, and
   the seat driving device can attach thereto a manually operable member with which the output member can be operated from outside the device, and
   when the electric motor fails to operate, the worm shaft can be rotated from outside the device using the manually operable member.

7. The seat driving device according to claim 5, wherein the tilting operation has a rearward tilting operation reclining the seat back on a flat position X side and a frontward tilting operation storing the seat back on a storage position Y side, and
   changing the rotation speed of the electric motor according to a switch operation by a user of the seat to change the operation speed of the seat back so as to perform the frontward tilting operation to be quicker than the rearward tilting operation.

* * * * *